A. R. MISKIN.
EARTH SCRAPER.
APPLICATION FILED JULY 9, 1921.
1,427,693.
Patented Aug. 29, 1922.
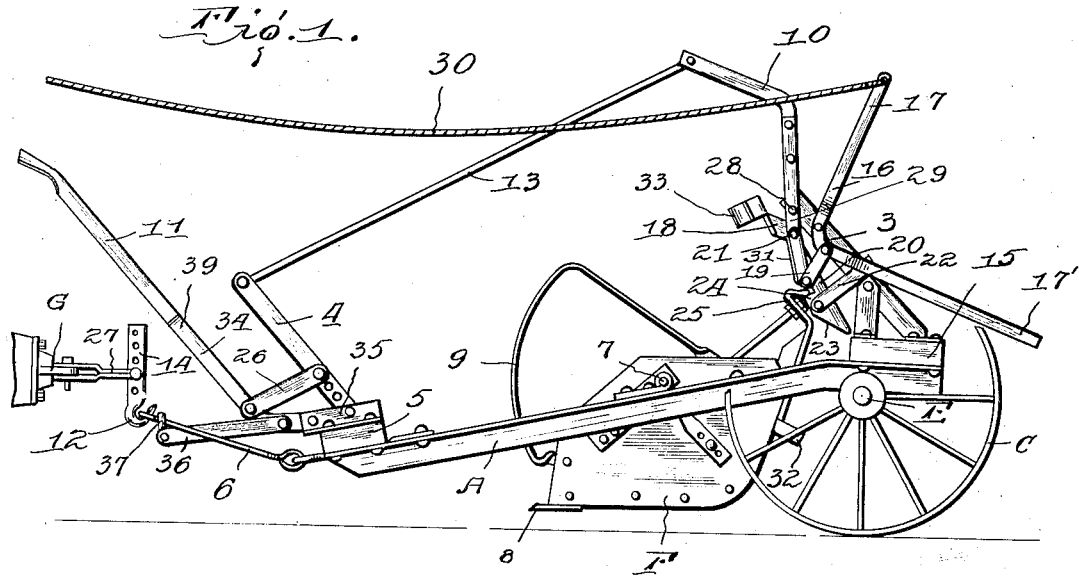
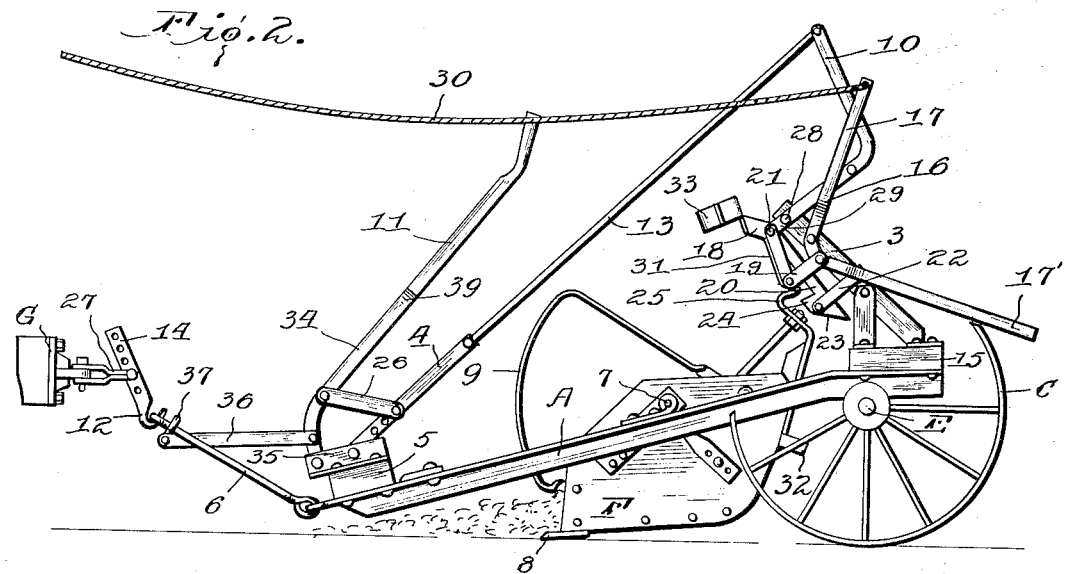
Arthur R. Miskin, Inventor
By John S. Backer, Attorney

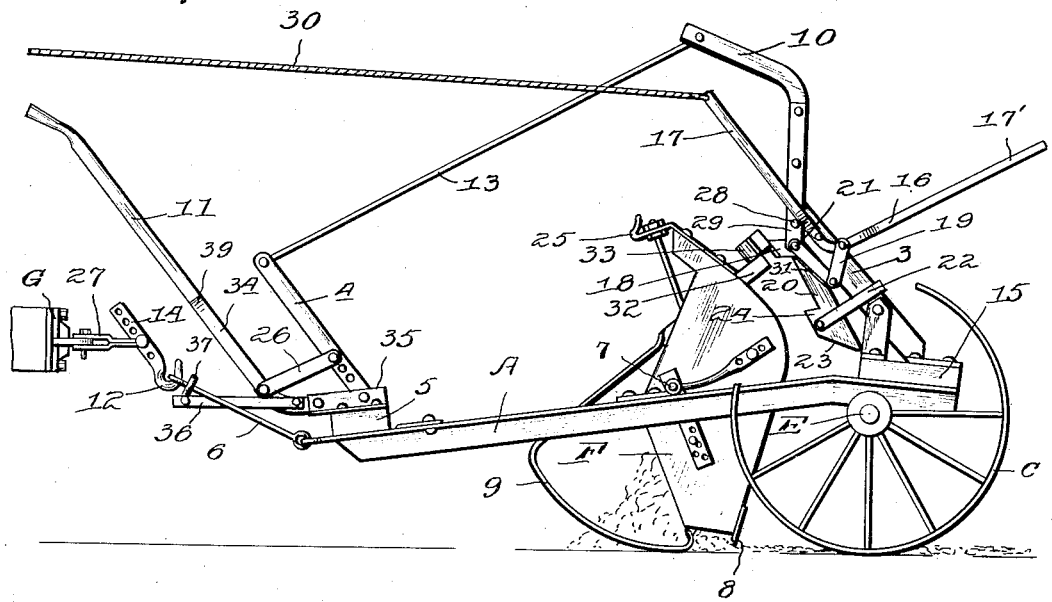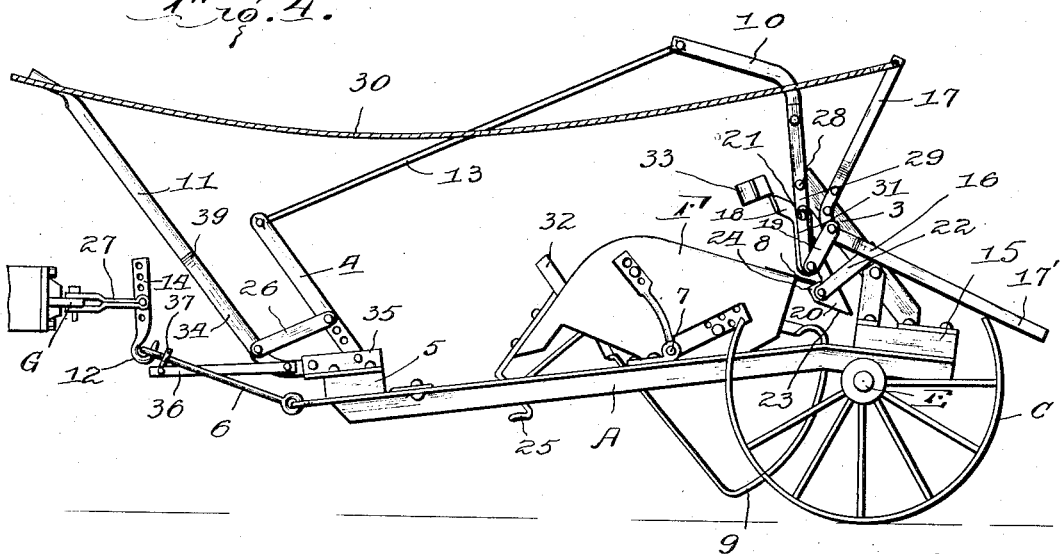

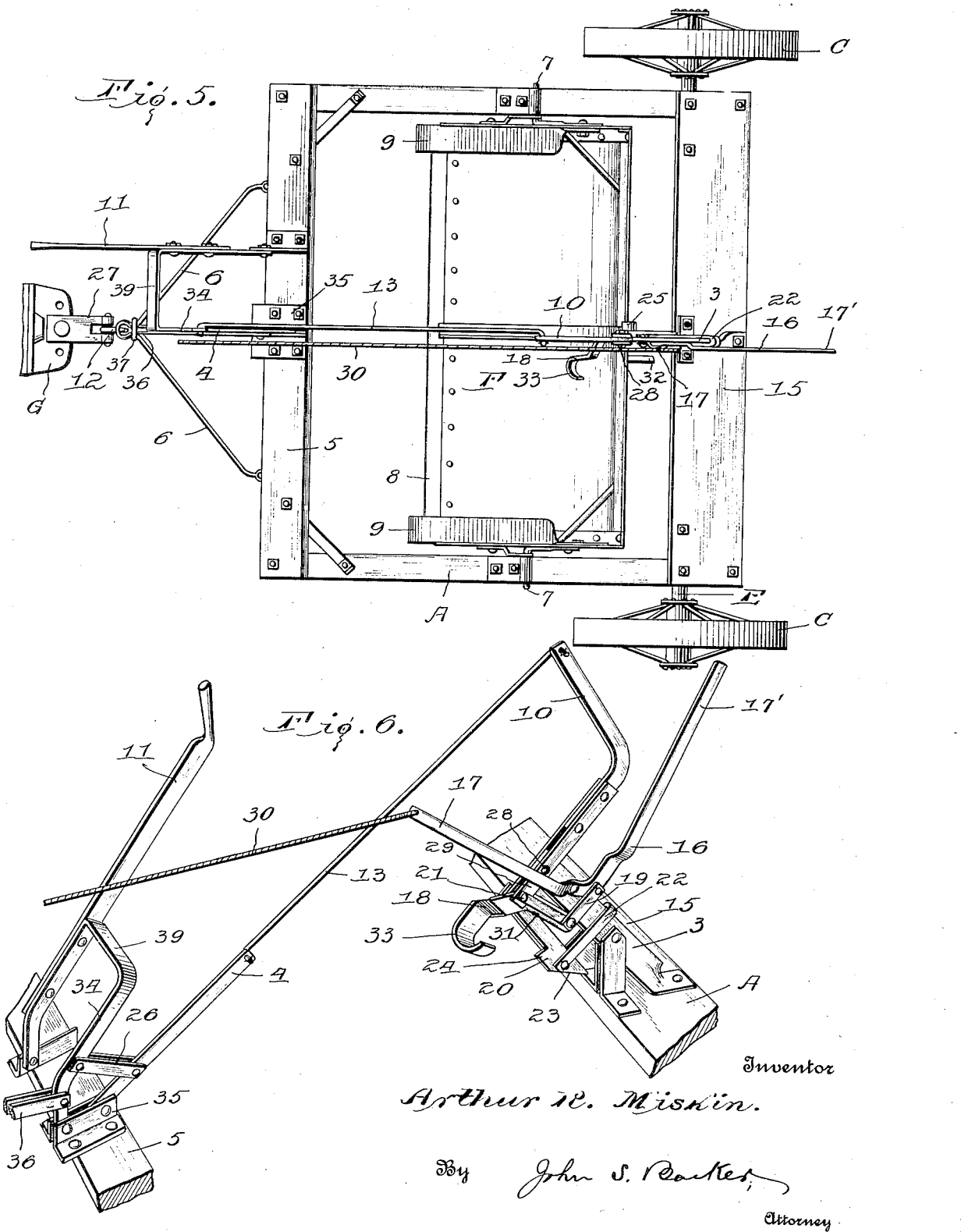

UNITED STATES PATENT OFFICE.

ARTHUR R. MISKIN, OF UCON, IDAHO.

EARTH SCRAPER.

1,427,693. Specification of Letters Patent. Patented Aug. 29, 1922.

Application filed July 9, 1921. Serial No. 483,545.

*To all whom it may concern:*

Be it known that I, ARTHUR R. MISKIN, a citizen of the United States, residing at Ucon, in the county of Bonneville and State of Idaho, have invented certain new and useful Improvements in Earth Scrapers, of which the following is a specification.

My invention relates to machines for scraping and moving earth and has for its object to improve such machines and especially to adapt them for use in connection with tractors such as are now manufactured for use upon farms.

I have already taken patents for improvements in earth scrapers, No. 1,269,484 of June 11, 1918, and No. 1,352,301 of September 7, 1920, and the machine illustrated in the accompanying drawings and to be hereinafter described has many features in common with the machines shown in those patents.

Figure 1 of the drawings is a side view of an earth scraper embodying my present improvements connected with a tractor by which it is moved, the parts being in the positions they assume when the scoop is loaded and the machine in transit.

Fig. 2 is a similar view illustrating the positions assumed by the parts when the scoop is being loaded with earth.

Fig. 3 is a similar view, the parts being in the positions they assume when the load of earth is being discharged and spread.

Fig. 4 is a side elevation representing the scoop entirely inverted.

Fig. 5 is a plan view of the machine, the parts being in the positions represented in Fig. 1.

Fig. 6 is a detail perspective view illustrating the arrangement and mounting of some of the operative parts of the machine that control the movements of the scoop.

Referring to the drawings, A represents the main frame of the machine which is supported at its rear by wheels C mounted upon an axle E. A scoop F is mounted in this frame and is supported on trunnions 7 so that it may revolve thereon to facilitate loading and discharging. The scoop is provided with a pair of runners 9, 9 and has the front edge of its bottom shod with a cutting blade 8. The parallel side bars of the frame A are united at their forward ends by cross bar 5 to which are connected the converging draft bars 6. A draft hook 12 engages with these draft bars which are united and formed into a loop to receive the hook at their forward ends. The stem of the hook is preferably flattened and perforated as represented in the drawings and to it is pivotally connected a clevis 27 adapted to engage with the draw head G of a tractor and constitute a connecting link between the latter and the scraping machine. The position of this draw head with reference to its distance from the surface of the ground remains substantially fixed under all conditions so that once the connection with the scraper has been made the forward end of the frame of the latter is held in fixed position vertically. This position may be varied from time to time as the nature of the work being done and the styles of scrapers and tractors employed may make desirable, the perforated stem 14 of the draft hook which under normal working conditions occupies an upwardly and forwardly inclined position, permitting the necessary adjustments.

In order to incline the scoop to bring its cutting blade into working engagement with the surface of the earth, as well as to maintain the scoop in position to transport its load as represented in Fig. 1, or to cause it to be inverted to discharge its load, I provide controlling mechanism which I will now describe.

4 indicates an upright lever pivotally supported upon the front cross piece 5. The upper part of this lever is connected by a link 13 with a lever 10 pivotally supported at 28 upon a standard 3 rising from the rear cross bar 15 of the frame A. The lever 10 is continued downwardly beyond its pivot 28 forming an extension 29 that carries several parts which are preferably and for convenience of manufacture, supported upon a common pin or bolt 21. The lower portion of the lever 10 is preferably bifurcated and straddles the standard 3. One of the parts that is supported upon the fulcrum pin 21 is a latch 20 formed with a hook 24 adapted to engage with a catch piece 25 carried by the scoop and extending upwardly from the rear thereof in position to be engaged by the latch. The lower under surface of the latch 20, below the hook 24 thereof, is inclined to form a cam 23 that co-operates with the catch piece 25 to lift the latch, whenever the scoop turns over from the dumping position shown in Fig. 4 to its normal position represented in Figs.

1 and 2. A loop 22 carried by the latch straddles the standard 3 and limits the extent to which the latch may fall under the influence of gravity.

Another part supported upon the fulcrum pin 21 is an arm 18, preferably bent and formed with a hooked end 33 adapted, under certain conditions, as when the scoop is discharging its load, as represented in Fig. 3, to engage with an arm 32 carried by the scoop F, and by reason of such engagement arrest the scoop in the position indicated in said Fig. 3.

16 indicates the dumping or trip lever which is pivotally supported upon the standard 3. The lever 16 is preferably formed with two arms, one of which, 17, extends upwardly and forwardly and has connected with it a cord 30 extending forwardly and forming means by which the trip lever may be operated by one occupying the usual driver's seat on the tractor. The other arm of the trip lever, 17', extends to the rear and is in convenient position to be operated by one walking upon the ground and following the scraping machine. This arrangement makes it possible to control the operation of the scraper either from the driver's seat on the tractor or from the rear of the scraper.

A link 19 unites the lever 16 with an extension 31 of the arm 18.

11 indicates the main operating lever pivotally supported upon the front cross bar 5 of the main frame, and within convenient reach of the operator occupying the driver's seat on the tractor. This lever is preferably formed with an offset portion 39 that is connected by a link 26 with the front lever 4. The extension 39 comprises a lever section 34 that is parallel with the lower part of the operating lever 11 and is preferably pivoted centrally, transversely, of the bar 5 and in the same bracket, 35, as is pivoted the lower end of the front lever 4. The offset frame 39 permits the operating lever 11 to be set to one side of the central longitudinal line of the machine in order to be situated so that it may be reached conveniently by the operator on the driver's seat of the tractor, and at the same time allows the lever 34, with its link connections 26 and 36, to be located in the central longitudinal plane of the machine where these parts may operate the most efficiently. A link 36 connects the lower portion of the lever 34 with a loop 37 that encircles the forward converging ends of the draft bars 6. The lower end of the link 34 is so shaped, and its connection with the bracket 35 is such that when the operating lever 11 is thrown to the rear as represented in Fig. 2 the connection of the link 36 with the lever 34 stands above the fulcrum of that lever, while when the operating lever is thrown forwardly, as represented in Fig. 1, the pivotal connection of link 36 and lever 34 is lowered and is preferably put in line horizontally with the fulcrum of the lever.

The operation of the machine may now be set forth. In Fig. 1 it is represented with its parts in the positions they occupy when the scraper is in transit, whether the scoop be filled or empty, the blade 8 being lifted clear of the surface of the ground. The operating lever 11 is thrown forward to the limit of its movement, which causes the forward end of the scraper frame to be raised. This is apparent when it is remembered that the draft connection of the scraper with the tractor is rigid, so far as vertical movements are concerned, and hence when the levers 11 and 34 are thrown forward, the toggle, formed by the link 36 and the lever 34, is straightened, the rear end of the lever 34, and with it the cross bar 5 of the main frame, are raised, and the draft parts are locked by the said toggle, with the front part of the frame in its most elevated working position. At the same time that the lever 11 is thrown forwardly the front lever 4 is also rocked in the same direction by the link 26, and this in turn, through the link 13, draws forward the upper end of the lever 10. By comparing Figs. 1 and 2 it will be seen that the forward movement of lever 10 just referred to carries its lower extension 29 downwardly. This drops the latch 20 and permits the scoop to rock slightly on its supports so that its cutting edge 8 inclines upwardly. The scoop is preferably balanced so that it tends to rock to the rear under normal conditions, and thus the catch piece 25 will rest upon the hook of the latch 20 and be held thereby. When the scoop is loaded, however, its center of gravity is usually in front of the axial line of the supporting trunnions 7, and unless provision be made to prevent, this will cause the front cutting edge 8 to incline downwardly and perhaps engage with the surface of the earth. I therefore arrange the connected ends of the arm or lever 31 and link 19 so that under normal conditions they lie directly above the end of the catch piece 25 with which the latch hook engages. This normal position is maintained by the weight of the rear arm 17' of trip lever 16. As the drawings clearly show the engaged end of the piece 25 thus lies in a sort of pocket or recess between the hook 24 and the united ends of the arm 31 and link 19. So therefore when the lever 10 is moved forwardly and the latch 20 carried downwardly, as has been described, the scoop will be positively tilted to the rear, should it be so loaded that its center of gravity is in front of the trunnions 7, because the arm 31, like the latch 20, is carried by the lower extension 29 of the lever 10 and is therefore positively moved downwardly when the lever 10 is rocked.

When the place where the load is to be dumped is reached the operator rocks the tilting or dumping lever 16, either by pulling upon the cord 30 or lifting the rear arm 17'. This movement rocks the extension arm 31, shifting its lower end from over the catch piece 25, which is thus released. The scoop being freed, its lower edge tips downward until it comes into engagement with the surface of the ground, and then further forward movement of the machine causes it to be tilted on its supports to discharging position. When it is desired to spill the earth gradually and spread it, the operator maintains the trip lever in the position last described, as by maintaining draft upon the cord 30, in order to maintain the arm 18 in such position that its hook 33 shall engage with the arm 32 carried by the scoop, as represented in Fig. 3, which engagement arrests further tilting of the scoop and maintains it in position to discharge and spread the earth as the scraper is drawn forward. On the other hand, if it be desired to dump the entire load in a heap the operator operates the trip lever to release the scoop and then immediately after the tilting of the scoop has begun releases the lever, allowing it to go back to normal position, which it assumes before the arm 32 comes opposite the catch 33 of the holding arm 18. When it does reach this position the arm 18 has been restored to its normal position, with its end 33 out of the path of the arm 32, so that the pan or scoop is free to make a half revolution, to the position represented in Fig. 4 discharging its load in a mound or heap. When the scoop comes into the position represented in Fig. 4 the cutting edge 8 thereof enters the recess between the hook 24, and the united ends of the arm 31 and link 19, where it is retained, holding the scoop in discharging position. If now the lever 16 be moved forward the scoop is released and left free to complete its turning movement toward normal position. As the scoop comes around to the normal position, represented in Fig. 1, the catch piece 25 moves under the cam surface 23 of the latch, lifting the latter until the end of the catch piece 25 passes the hook 24, when the latch falls by gravity into retaining position to prevent reverse movement of the scoop. Further forward turning movement of the scoop is prevented by the end of the arm 31 which is now in normal position. The parts are now again in position for transit.

When it is desired to load the scoop the operating lever 11 is thrown to the rear. This breaks the toggle lock, formed by the link 36 and lever 34, permitting the forward end of the main frame to drop. At the same time, the front lever 4 is tilted to the rear and that in turn moves the rear lever 10 backward. The rocking of this lever lifts its lower end, raising the catch 25. This in turn lifts the rear edge of the scoop, tilting it so that its front edge is inclined downwardly, being brought, by this tilting of the scoop and the dropping of the front end of the main frame, into engagement with the soil so that forward movement of the machine results in the scraper being loaded. The sequence of operations just described may then be repeated.

It will be seen by reference to Fig. 2 that when the scoop is in loading position the lever 4 and link 13 are substantially in line with each other, and hence constitute a lock for the lever 10, the elements of such lock being in tension, due to the fact that the pan or scoop F when loading tends to roll forward, and, by reason of the engagement of the catch piece 25 with the end of the arm 31, to rock the lever 10 to the rear. But this tendency is resisted by the lock referred to. At the same time, that is, while the scoop is being loaded, the pull of the tractor tends to lessen the angle between the draft bars 6 and the frame A and to pull the lever 34 and connected parts forward, bringing them to the position shown in Fig. 1. However, this tendency is not ordinarily sufficient to break the lock, formed by the parts 4 and 13 being in line with each other as just explained. If, however, in loading the edge of the scoop should come into engagement with some obstruction, such as a deeply embedded rock, the draft of the tractor upon the frame would finally be sufficiently great to bring the parts to the position shown in Fig. 1 and tilt the scoop from loading to carrying position before the strains upon the apparatus became sufficiently great to break any of the parts. Another advantage incident to the balancing of the draft of the tractor against resistance of the load and the tendency of the scoop to turn over while being loaded is that it makes easy the manual operation of the lever 11, since the operator has only to overcome the difference between these two opposing forces to effect a shifting of the parts from the position of Fig. 2 to that of Fig. 1.

What I claim is:—

1. In an earth scraping machine, the combination, with a main frame carrying the scraping element and having running supports at its rear while its front end is free to move toward and from the surface of the ground, of a draft connection secured to the front end of the said frame, a draft attachment to which the draft connection is secured, fixed vertically, a lever pivotally supported on the front portion of the frame, a link between the said lever and the draft connection arranged so that the swinging of the lever causes the front portion of the frame to rise or fall, and a lock for the draft connection when the frame is in raised position.

2. In an earth scraping machine, the combination, with a main frame carrying the scraping element its forward end being free to move toward and from the surface of the ground, of a draft connection for the frame secured to its forward portion and adapted to be connected with a tractor, a lever pivotally supported on the front portion of the scraper frame in approximately the central longitudinal plane thereof, a link between the said lever and the draft connection arranged so that the swinging of the lever causes the front portion of the frame to rise or fall, and an operating lever offset to one side of the first named lever so as to be conveniently operated by a person riding on the tractor, and connected with the first lever to operate the latter.

3. In an earth scraping machine, the combination, with a main frame carrying the scraping element, its front end being free to rise and fall with reference to the surface of the ground, of draft bars connected with the forward portion of the frame, a clevis adapted to be secured to the draft head of a tractor, a draft hook for engaging with the draft bars, having a flattened stem in which are formed a series of perforations, to which is pivotally connected the said clevis, a lever supported on the front portion of the scraper frame, a link between the lever and the draft bars, the connection with the latter being near the point where the draft hook engages therewith, the link being arranged so that the swinging of the lever causes the forward portion of the frame to rise or fall as the lever is rocked, and means for operating the lever.

4. In an earth scraping machine, the combination, with a main frame carrying the scraping element, the rear portion of the frame having ground supports and the front portion being free to be moved toward and from the surface of the ground, or draft bars connected with the forward portion of the frame and adapted to be connected with a tractor, a lever mounted on the forward portion of the frame, a link between the lever and the draft connection arranged so that the swinging of the lever causes the forward end of the frame to rise or fall, a second lever also pivoted on the forward portion of the frame connected with the first lever so as to be moved thereby, means for changing the angular position of the scraping element relative to the ground operated by the movements of the second lever, and operating devices for controlling the movements of the said connected levers.

5. In an earth scraping machine, the combination of a main frame, a draft connection with which the front portion of the frame is connected, arranged to constitute a support therefor practically rigid as to vertical movements, a tiltable scraper supported in the frame having a soil-engaging front edge, and means for controlling the movements of the main frame and scraper arranged to simultaneously lower the front end of the frame relative to the draft connection and elevate the rear end of the scraper and present its soil-engaging edge at a cutting angle to the ground.

6. In an earth scraping machine, the combination of a main frame, a draft connection with which the front portion of the frame is connected, arranged to constitute a support therefor practically rigid as to vertical movements, a tiltable scraper supported in the frame having a soil-engaging front edge, means for controlling the movements of the frame and the scraper comprising means for simultaneously lowering the front end of the main frame relative to the draft connection and elevating the rear end of the scraper to present its soil-engaging edge at a cutting angle to the ground, and maintaining these parts in this position, and other means operable at will for releasing the scraper to permit it to turn to discharging position.

7. In an earth scraping machine, the combination of a main frame, a tilting scraper supported therein, having a soil-engaging edge, a lever supported on the forward portion of the frame, a lever mounted on the rear portion of the frame, connections between the last named lever and the scraper for tilting the latter with reference to the soil surface as the lever is moved, a link between the said front and rear levers, its connections with the levers being such that when the rear lever is moved to incline the scraper to a position to cut the soil the forward lever and the connecting link are in line with each other, thus constituting a lock, and means for operating the forward lever and through it the rear lever.

8. In an earth scraping machine, the combination of a main frame supported at its rear upon wheels and its front portion being unsupported so that it may be moved toward or from the surface of the ground, a tilting scraper supported in the frame, draft bars secured to the forward portion of the frame, a lever supported on the forward portion of the frame, another lever mounted on the rear portion of the frame, connections between the last named lever and the scraper for tilting the latter with reference to the soil surface as the lever is moved, a link between the said front and rear levers, its connections with the levers being such that when the rear lever is moved to incline the scraper to a position to cut the soil the forward lever and the connecting link are in line with each other, thus constituting a lock, connections between the forward lever and the draft connections arranged to cause the forward portion of the frame to be depressed as the edge of the scraper is inclined to soil-cutting position and to be raised as it is tilted from that position, the said connections including a lock for the parts when the forward part of the frame is raised.

9. In an earth scraping machine, the combination of a supporting frame, draft connections therefor adapted to be connected with a tractor, a scraper supported therein so as to be free to turn for loading, transporting and discharging conditions, a movable stop to prevent the turning of the scraper in a direction to permit its discharging, and means for moving the stop to free the scraper extending forward to a position convenient to be operated by one riding upon and operating the tractor.

10. In an earth scraping machine, the combination of a frame supported at its rear upon wheels while its front portion is free to be moved toward or from the surface of the ground, a scraper supported in the frame so as to turn for loading and discharging purposes, a lever mounted on the forward portion of the frame, a second lever mounted on the rear portion of the frame, connections between the latter lever and the scraper for tilting the scraper to incline it to loading position, connections between the forward and rear levers by which the latter is operated from the former, manually controlled means on the forward portion of the frame for operating the first mentioned lever, a stop for arresting the turning of the scraper in a direction to discharge its load carried by the second, rear, lever, and means for moving the stop to free the scraper so that it may turn to discharge its load extending forward to a position to be operated from in front of the machine.

ARTHUR R. MISKIN.